(12) United States Patent
Peng et al.

(10) Patent No.: US 8,349,394 B2
(45) Date of Patent: Jan. 8, 2013

(54) METHOD OF FORMING AN ELECTRODE INCLUDING AN ELECTROCHEMICAL CATALYST LAYER

(75) Inventors: Chao Peng, Yonghe (TW); Jo-Lin Lan, Kaohsiung (TW); Ya-Huei Chang, Taoyaun (TW); Wen-Chi Hsu, Sinying (TW); Hai-Peng Cheng, Banciao (TW); Shien-Ping Feng, Jhudong Township, Hsinchu County (TW); Wen-Hsiang Chen, Hsinchu (TW); Tzu-Chien Wei, Hsinchu (TW)

(73) Assignee: Tripod Technology Corporation, Tao Yuan County (TW)

( * ) Notice: Subject to any disclaimer, the term of this patent is extended or adjusted under 35 U.S.C. 154(b) by 1223 days.

(21) Appl. No.: 12/213,307

(22) Filed: Jun. 18, 2008

(65) Prior Publication Data

US 2009/0263569 A1 Oct. 22, 2009

(30) Foreign Application Priority Data

Apr. 21, 2008 (TW) .............................. 97114547 A (51) Int. Cl.
*B05D 5/12* (2006.01)
(52) U.S. Cl. .................. 427/99.1; 427/99.2; 427/77
(58) Field of Classification Search ............ 427/77, 427/99.1, 99.2
See application file for complete search history.

(56) References Cited

U.S. PATENT DOCUMENTS

2008/0063788 A1 3/2008 Wei et al.

OTHER PUBLICATIONS

Kuo et al, Stabilizing effect of pseudo-dendritic polyethylenimine on platinum nanoparticles, J. Phys. Chem. B 2006, 110, 3071-3077.*

Thermal decomposition behaviors of PVP coated on platinum nanoparticles; Y.K. Du et al; J of applied polymer science, vol. 99, 23-26, 2006.*

Tzu-Chien Wei, Chi-Chao Wan, Yung-Yun Wang, Chih-Ming Chen, Han-Sheng Shiu, Immobilization of Poly (N-Vinyl-2-pyrrolidone)-Capped Platinum Nanoclusters on Indium-Tin Oxide Glass and Its Application in Dye-Sensitized Solar Cells; J. Phys. Chem., 2007 American Chemical Society, 4847-4853, Published on web Mar. 6, 2007.

T.C. Wei, C.C. Wan, and Y.Y. Wang, Poly(N-vinyl-2-pyrrolidone)-capped platinum nanoclusters on indium-tin oxide glass as counterelectrode for dye-sensitized solar cells; Applied Physics Letters 88, 2006, 103122-1, American Institute of Physics.

Papageorgiou, Counter-Electrode Function in Nanocrystalline Photoelectrochemical Cell Configurations, Coord. Chem. Rev., 2004, 248, pp. 1421-1446.

Wang, X-Ray Photoelectron Spectroscopy Analysis of the Stability of Platinized Catalytic Electrodes in Dye-Sensitized Solar Calls, Surf. Interface Anal, 2004, 36, pp. 1437-1440.

* cited by examiner

*Primary Examiner* — Joseph Del Sole
*Assistant Examiner* — Kimberly A Stewart
(74) *Attorney, Agent, or Firm* — Rosenberg, Klein & Lee (57) ABSTRACT

A method of forming an electrode having an electrochemical catalyst layer is disclosed, which comprises providing a substrate with a conductive layer formed on the surface of a substrate, conditioning the surface of the substrate, immersing the substrate in a solution containing polymer-capped noble metal nanoclusters dispersed therein to form a polymer-protected electrochemical catalyst layer on the conditioned surface of the substrate, and thermally treating the polymer-protected electrochemical catalyst layer at a temperature approximately below 300° C.

6 Claims, 8 Drawing Sheets

METHOD OF FORMING AN ELECTRODE INCLUDING AN ELECTROCHEMICAL CATALYST LAYER

RELATED APPLICATIONS

This application claims priority to Taiwan Application Serial Number 97114547, filed Apr. 21, 2008, which is herein incorporated by reference.

BACKGROUND

1. Field of Invention

The present invention relates to a method of forming an electrode with an electrochemical catalyst layer. More particularly, the present invention relates to a method for forming an electrode including an electrochemical catalyst layer comprised of polymer-capped nanoclusters.

2. Description of Related Art

Figure 1:
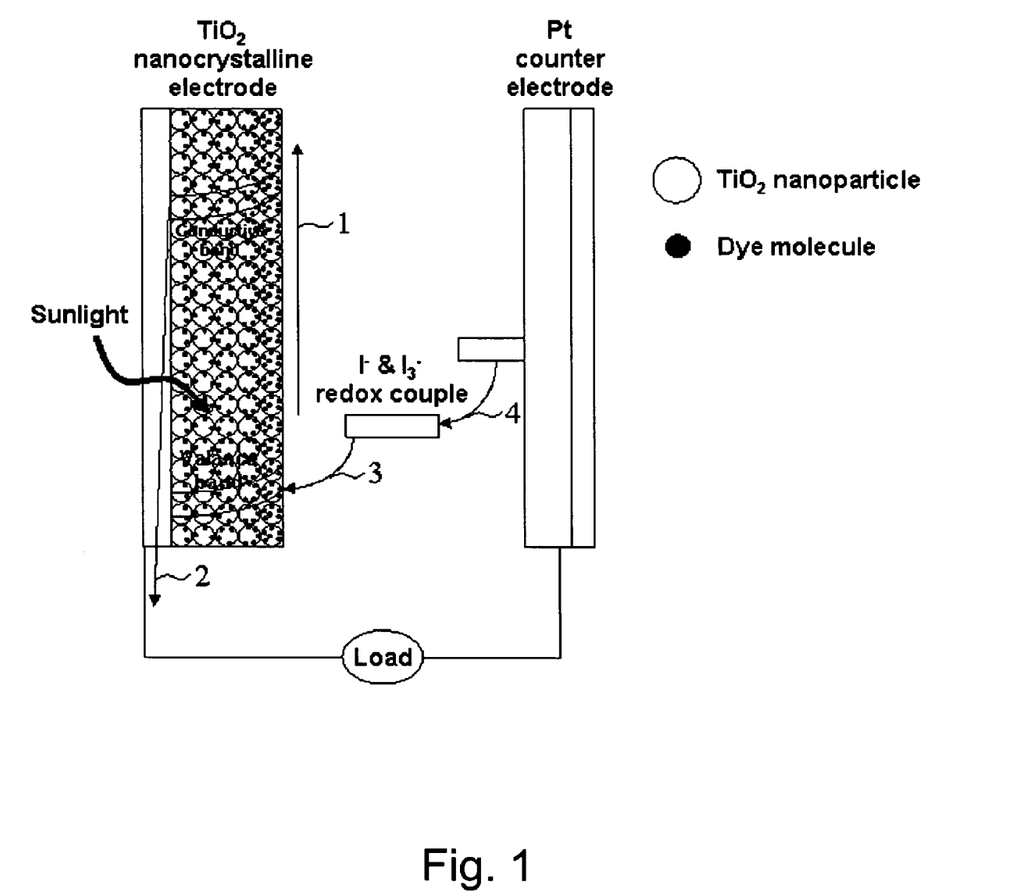
FIG. 1 is a schematic view showing the working principle of a conventional DSSC.

Recently, dye-sensitized solar cells (DSSC) have attracted attention as a potentially low-cost energy device. Typically, a DSSC consists of a dye-sensitized nanocrystalline semiconductor film on an Indium-tin oxide (ITO) or fluorine-doped tin oxide (FTO) glass as the photo-anode, a platinized counter electrode acting as the cathode, and iodide/tri-iodide redox couples in a proper mediator as the electrolyte. The working principle of a DSSC is summarized in five steps below, as shown in FIG. 1. (1) Photo-excitation on dye molecules induces charge separation (see arrow 1). (2) Charge (electron) is injected into the conduction band of mesoporous titanium dioxide ($TiO_2$). (3) Charge passes through the outer circuit via the electronic load (see arrow 2). (4) Dye reduces to ground state by redox couples in the electrolyte (see arrow 3). (5) Redox couples reduce on counter electrode by the charge coming from the outer circuit (see arrow 4).

In a DSSC, the counter electrode functions as a reduction reaction site expressed as following:

$$I_3^- + 2e^- \rightarrow I^-.$$

This reduction reaction is vital since iodide ions are responsible for the regeneration of oxidized dye molecules. Once the dye regeneration can not catch up the dye oxidation (i.e. electron injection from dye molecules to the conduction band of $TiO_2$), the conversion efficiency is reduced and the DSSC deteriorates because iodine crystals may be deposited on the surface of the counter electrode.

In the prior arts, the naked ITO or FTO glass shows extremely slow kinetics of tri-iodide reduction in organic solvents. In order to minimize the over-potential, catalyst material is applied to the ITO or FTO glass to speed up the reaction.

So far, platinum (Pt) has been used almost exclusively as the catalyst material. Depending on the cost and efficiency, there are many methods to form a thin layer of Pt. Sputtering is a common method. This platinized electrode exhibits fair performance. However, sputtering requires an ultra-high vacuum environment and is not suitable for mass production.

Papageorgiou et al. have developed a method called "thermal cluster platinum catalyst" (*Coord. Chem. Rev.*, 2004, 248, pp 1421). This method provides low Pt loading (about 2~10 µg/cm²), superior kinetic performance (charge-transfer resistance, $R_{CT} < 0.1$ Ωcm²) and mechanical stability with respect to conventional platinum deposition methods like sputtering or electrochemical deposition. Wang et al. (*Surf. Interface Anal.*, 2004, 36, pp 1437) have studied the stability of thermal cluster Pt (TCP) electrode with X-ray photoelectron spectroscopy and found that the electrochemical catalytic performance of TCP may be reduced slightly due to adsorbed iodide on TCP's surface. The electrochemical catalytic performance can be regenerated with re-heating treatment, but this method requires heating of up to 380° C. It consumes power, and is not suitable for mass production.

Other materials such as carbon and conducting polymers are also proposed to be the catalyst for tri-iodide reaction in DSSC. These new materials usually need being deposited as thicker films on the substrate to obtain acceptable catalytic effect, and are still being developed.

Hence, lots of research on DSSC and technologies relative to DSSC address lower costs and higher performance.

SUMMARY

It is therefore an objective of the invention to provide a method of forming an electrode with an electrochemical catalyst layer comprised of polymer-capped nanoclusters. Using this method, the amount of noble metals used in the electrochemical catalyst layer is reduced, and thus the cost is reduced.

It is another objective of the invention to provide a method of manufacturing an electrochemical device including an electrode made by the aforementioned method. The performance of the electrochemical device is better because the electrode thereof has greater catalytic effect.

In accordance with one aspect of the invention, a method of forming an electrode with an electrochemical catalyst layer is provided. The method includes the steps of providing a substrate with a conductive layer formed on a surface of the substrate, conditioning the surface of the substrate, dipping the substrate into a solution containing polymer-capped noble metal nanoclusters to form a polymer-protected electrochemical catalyst layer on the conditioned surface of the substrate, and thermally treating the polymer-protected electrochemical catalyst layer at a temperature approximately below 300° C.

In accordance with another aspect of the invention, a method of manufacturing an electrochemical device is provided. The method includes the steps of forming a first electrode and a second electrode, assembling the first electrode and the second electrode, and injecting an electrolyte into a space between the first electrode and the second electrode. The first electrode is formed by providing a substrate with a conductive layer thereon, conditioning a surface of the substrate, dipping the substrate into a solution containing polymer-capped noble metal nanoclusters to form a polymer-protected electrochemical catalyst layer on the conditioned surface of the substrate, and thermally treating the polymer-protected electrochemical catalyst layer at a temperature approximately below 300° C.

As embodied and broadly described herein, the invention provides a method to reduce the amount of noble metal used and improve the performance of the resultant electrochemical device. Also, the inventive method is simpler than conventional depositing methods that require high degree of vacuum, and hence is suitable for mass production.

It is to be understood that both the foregoing general description and the following detailed description are by examples, and are intended to provide further explanation of the invention as claimed.

BRIEF DESCRIPTION OF THE DRAWINGS

The foregoing and other objects, features and advantages of the present invention will become more apparent from the following detailed description when taken in conjunction with the accompanying drawings, in which.

DESCRIPTION OF THE PREFERRED EMBODIMENTS

Reference will now be made in detail to the embodiments of the invention, examples of which are illustrated in the accompanying drawings. Wherever possible, the same reference numbers are used in the drawings and the description to refer to the same or like parts.

Figure 2A:
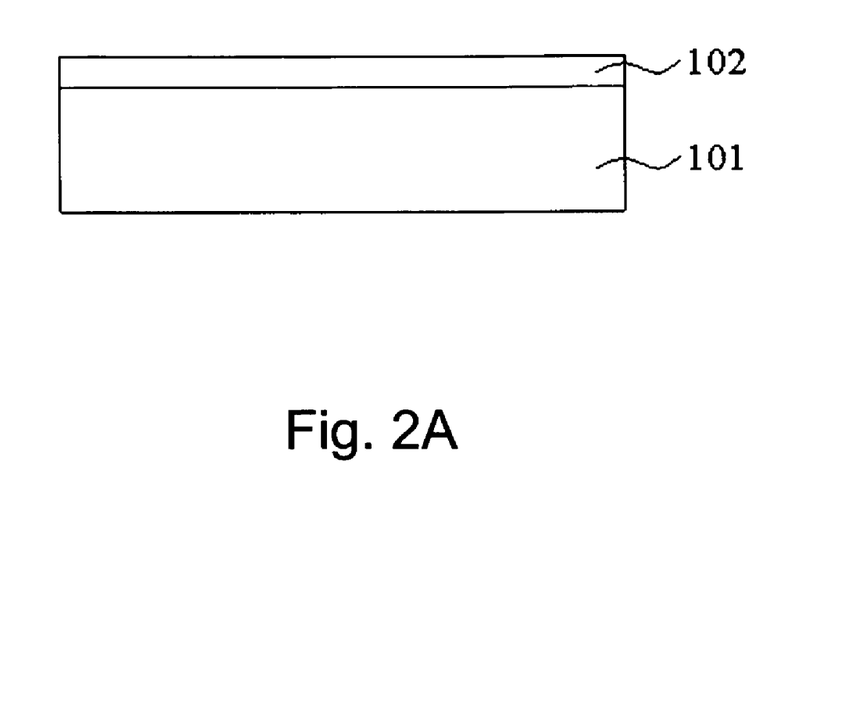
FIG. 2A through FIG. 2D are cross-sectional views illustrating a method of forming an electrode having an electrochemical catalyst layer according to a preferred embodiment of the invention.

The method of forming an electrode having an electrochemical catalyst layer according to one embodiment of the invention is shown in FIG. 2A to FIG. 2D. Referring to FIG. 2A, a substrate 101 is provided. The material of the substrate 101 is not limited, but is preferably glass or plastic as applied to the electrode of a solar cell. A conductive layer 102 for transferring charges is formed on the surface of the substrate 101. Non-limiting examples of the conductive layer 102 include ITO glass, graphite, and metal like nickel and stainless steel. Although there is no particular limitation in the methods for forming the conductive layer, conventional methods known to those skilled in the art, including sputtering, evaporation and coating, may be used.

Figure 2B:
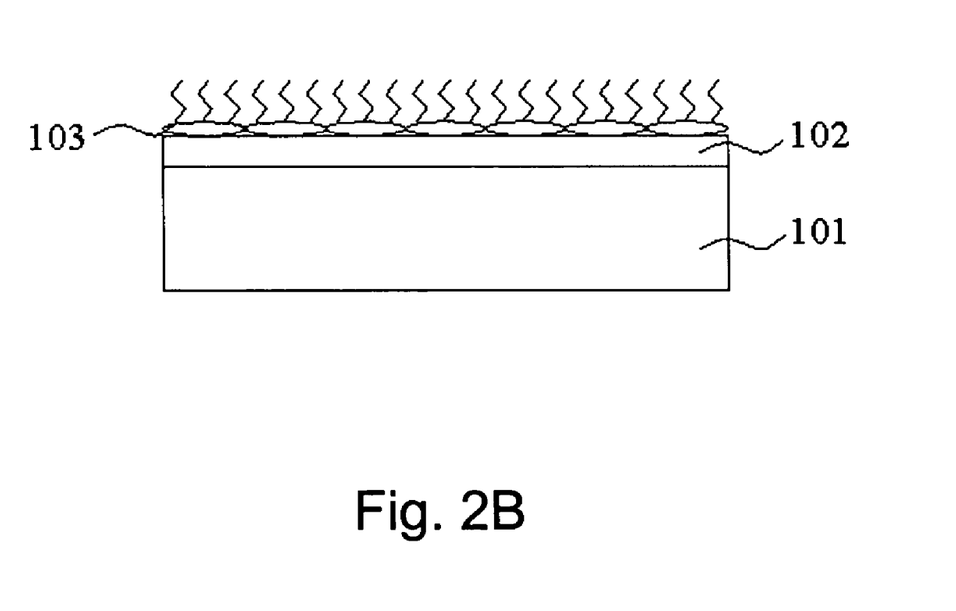

Referring to FIG. 2B, the surface of the conductive layer 102 is conditioned by, for example, immersing or dipping the substrate 101 in a solution containing surfactants to form a conditioner layer 103 on the surface of the conductive layer 102. Preferably, a cationic surfactant is utilized, and quaternary ammonium salt is the common one. The conditioner layer is adapted to change the surface charge state, so as to improve the adhesion between the conductive layer 102 and a succeeding film.

Figure 2C:
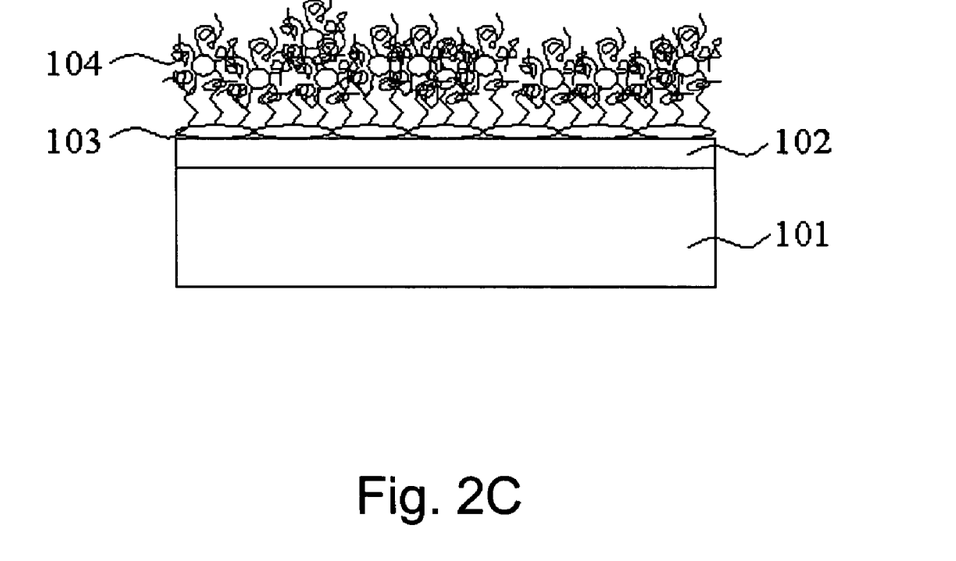

The substrate 101 is then immersed in a second solution as shown in FIG. 2C. Such kinds of solutions contain polymer-capped noble metal nanoclusters dispersed therein. These polymer-capped noble metal nanoclusters are attached to the conditioner layer 103 over the substrate 101 so that a noble metal catalyst layer 104 is formed on the surface of the conditioner layer 103. In one embodiment, a cationic surfactant is used to condition the substrate, resulting in the polymer-capped noble metal with negative charges being adsorbed on the substrate.

The second solution may be initially prepared by providing a polymer solution capable of capping a noble metal, followed by adding the precursor of the noble metal salt into the polymer solution. Preferably, the polymer solution is composed of poly(N-vinyl-2-pyrrolidone) (PVP), poly(acrylamide) (PAM), poly(vinyl alcohol) (PVAL), poly(acrylic acid) (PAA), poly(ethyleneimine) (PEI) or the like. Preferably, the noble metal from precursors is palladium (Pd), platinum (Pt), ruthenium (Ru), silver (Ag), gold (Au), or any other noble metal which can serve as a catalyst in a reduction reaction. Finally, the reductant for precursors is introduced into the polymer solution containing noble metal salt, and thus the noble metal salt is reduced to noble metal nanoclusters dispersed uniformly in the solution since polymers cap the noble metal. As such, when the substrate 101 is dipped into the second solution, an electrochemical catalyst layer formed from polymer-capped nanoclusters of the noble metal is uniformly distributed over the substrate 101. The method for preparing a solution comprising polymer-capped metal is described in detail by Hidefumi Hirai et al. in *Polymers for Advanced Technologies* (12, pp 724~733), published in 2001, entitled "Protecting polymers in suspension of metal nanoparticles", which is hereby incorporated by reference in its entirety.

The solvent for the second solution may be used with no particular limitation. Preferably, the solvent has solubility with polymer and a low boiling point.

It is to be noted that the mixing ratio in the second solution on the weight basis, i.e. ratio of the weight of the polymer (PW) to the weight of the noble metal (MW) is about 0.5~6. If the amount of polymer in the second solution is not enough, stable suspension cannot be achieved and a precipitating phenomenon may occur. On the other hand, if the amount of polymer in the second solution is excessive, the noble metal cannot work well and then the efficiency of the catalyst decreases. More details will be described in the following examples.

Generally, the size of noble metal nanoclusters ranges between about 10 nanometers (nm) and about 50 nm. A relatively thin electrochemical catalyst layer is formed using well-dispersed noble metal nanoclusters. In other words, an acceptable catalytic effect may be induced with less amount of noble metal.

It is preferable that the immersion temperature for the substrate 101 in the second solution is lower than 50° C., and more preferably is at room temperature. According to a preferred embodiment of the invention, it is not necessary for the electrode with an electrochemical catalyst layer to be subjected to high temperature processing. Therefore, there is less impact on the sheet resistance of the conductive layer 102 of the substrate 101, and the resultant cell performance is controlled well. Compared with conventional deposition methods like sputtering, the operations and equipment provided herein is simplified, and the manufacturing cost is reduced.

Figure 2D:
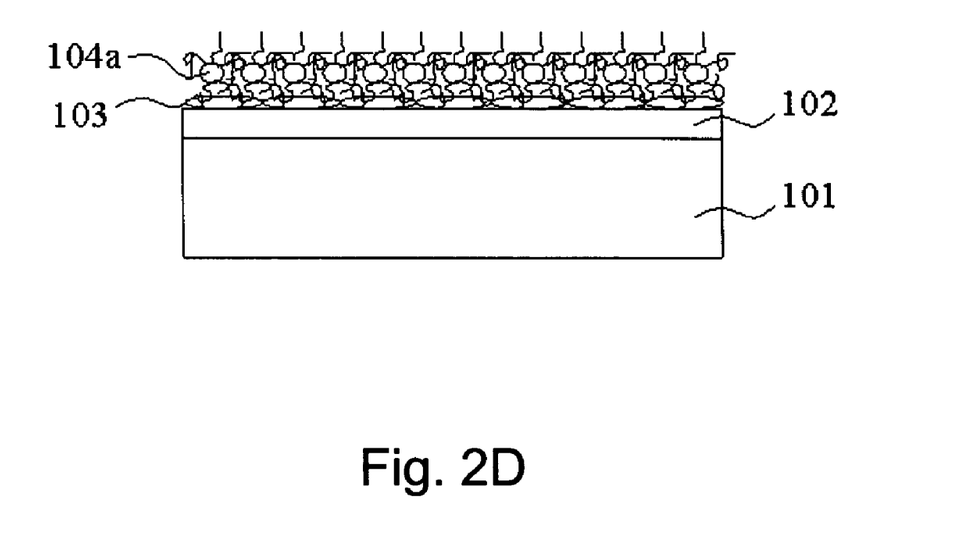

Next, referring to FIG. 2D, the structure in FIG. 2C is thermally treated such that the surfactants and polymers over the substrate 101 are degraded partially or completely to expose noble metal nanoclusters 104a. It is to be noted that the thermal-treating temperature in this stage is substantially lower than the temperature to regenerate the electrochemical catalytic performance in prior arts (i.e. 380° C.). Preferably, the structure is thermally treated at a temperature approximately below 300° C. for less than 30 minutes. In one embodiment, the electrode with the noble metal catalyst layer 104 is heated at about 270° C. for 10 minutes. The thermal-treating temperature and duration may vary dependent on the types of surfactants, polymers, noble metal, and substrates, the structure of electrodes, as well as the configuration of cells. The performance of electrodes implemented by thermal treatment is improved, which will be further described in the following examples.

Figure 3:
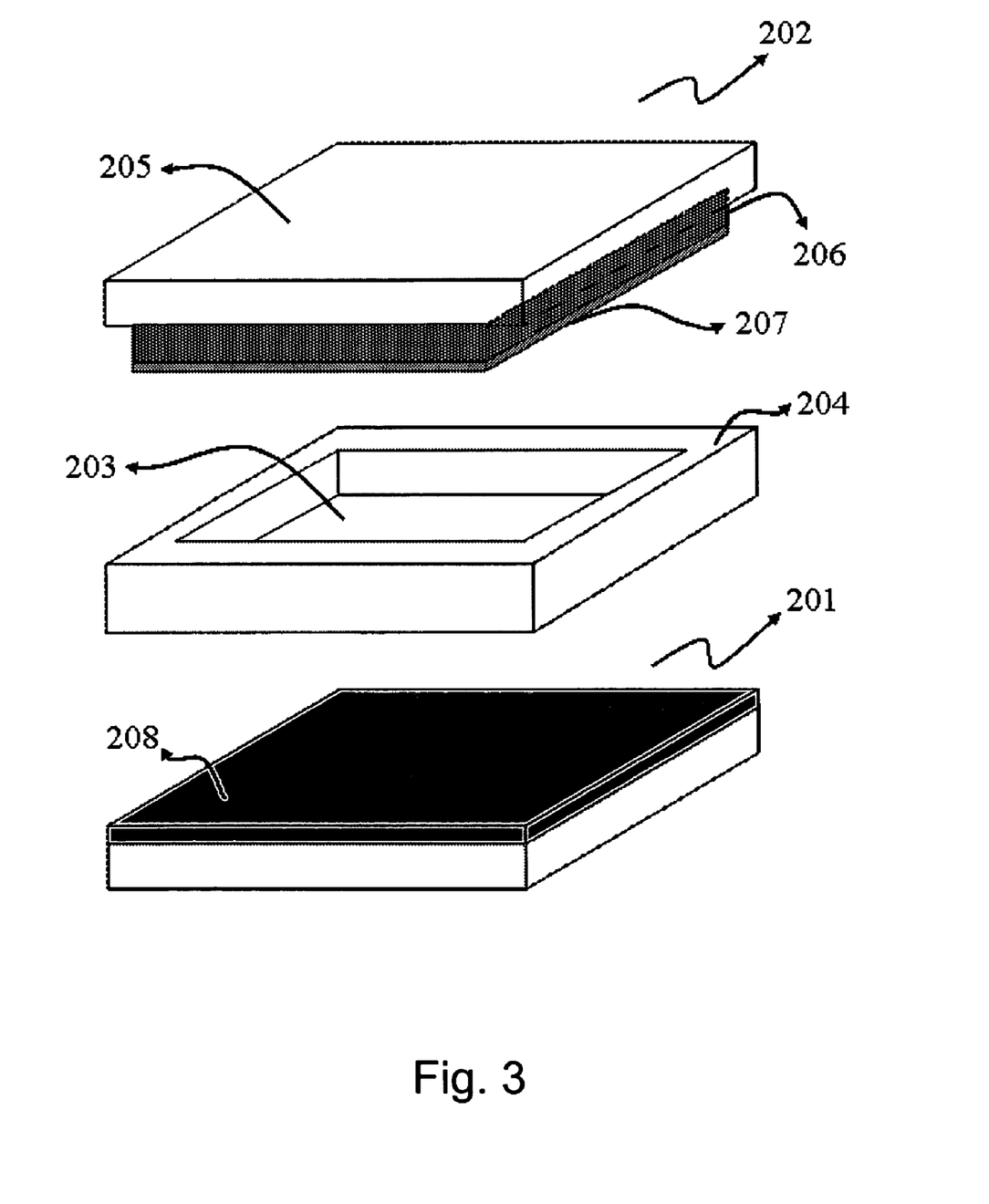
FIG. 3 is a three-dimensional exploded view showing an electrochemical device manufactured by the method according to one embodiment of the invention.

FIG. 3 is a perspective exploded view of an electrochemical device with an electrode made in accordance with one embodiment of the invention. As illustrated in FIG. 3, the electrochemical device includes a cathode 201, an anode 202, a sealing layer 204 sandwiched between the cathode 201 and the anode 202, and an electrolyte (filling in a hollow 203 of the sealing layer 204). The electrochemical device encompasses all types of devices to perform electrochemical reactions. Particular examples of the electrochemical device are fuel cells or solar cells.

Provided that the electrochemical device in one embodiment is a dye-sensitized solar cell (DSSC), one or both of the electrodes (i.e. the cathode 201 and/or the anode 202) are formed by the aforementioned method in FIG. 2A to FIG. 2D. Preferably, the cathode 201 has the electrochemical catalyst layer 208. In other words, the electrode comprises a conductive layer formed on a surface of a substrate, a conditioner layer formed on a surface of the conductive layer, and a plurality of polymer-capped noble metal nanoclusters grabbed by the conditioner layer as an electrochemical catalyst layer of the electrode. Preferably, the conductive layer is ITO glass, graphite or metal, such as nickel and stainless steel. Preferably, the polymer contained in the electrochemical catalyst layer of the electrode is poly(N-vinyl-2-pyrrolidone) (PVP), poly(acrylamide) (PAM), poly(vinyl alcohol) (PVAL), poly(acrylic acid) (PM), poly(ethyleneimine) (PEI) or the like, and the noble metal capped by polymers is selected from the group consisting of palladium, platinum, ruthenium, silver, and gold.

The anode of a DSSC (i.e. the electrode without the electrochemical catalyst layer) preferably includes a transparent conductive glass 205 on a substrate. Non-limiting examples of the transparent conductive glass 205 include indium tin oxide (ITO), fluorine-doped tin oxide (FTO), antimony-doped tin oxide (ATO), aluminum-doped zinc oxide (AZO), gallium-doped zinc oxide (GZO), or indium zinc oxide (IZO). Generally, the anode also includes a $TiO_2$ layer 206 formed on the surface of the transparent conductive glass 205; wherein the $TiO_2$ layer 206 has dyes 207 near the surface thereof. The anode of a DSSC may be manufactured by a conventional method known to those skilled in the art.

The dye commonly used in a DSSC may be represented by Formula 1, Formula 2, Formula 3, or Formula 4 below, but is not limited thereto. Also, Nazeeruddin et al. have studied the property and structure of dyes, published in the *Journal of Physical Chemistry* (107, pp 8981) in 2003, entitled "Investigation of sensitizer adsorption and the influence of protons on current and voltage of a dye-sensitized nanocrystalline $TiO_2$ solar cell", which is hereby incorporated by reference in its entirety.

N3

[Formula 1]

N719

[Formula 2]

N712

[Formula 3]

Black dye

[Formula 4]

② indicates text missing or illegible when filed

After forming the cathode 201 and the anode 202, the electrodes are assembled by, for example, a conventional method known to those skilled in the art to construct an electrochemical device. In one embodiment, the cathode 201 and the anode 202 are laminated by means of an adhesive (e.g.

a sealing layer 204), and an electrolyte is injected into the space between the electrodes through an inlet. More particularly, the timing for injecting the electrolyte into the electrochemical device depends on the desired quality of the electrochemical device and the manufacturing process for the final product. So the electrolyte may be injected into the electrochemical device during the assembly of the electrochemical device or at the final step of the assembly. Although there is no particular limitation in material for the sealing layer, it is preferable the sealing layer is a polymer film capable of thermal condensation at a low temperature.

BEST MODE FOR CARRYING OUT THE INVENTION

The preferred embodiments of the invention will be described in more detail hereinafter. It is to be understood that the following examples are illustrative only and the present invention is not limited thereto.

EXAMPLE 1

Manufacture of an Electrode Comprising an Electrochemical Catalyst Layer and a Solar Cell Using the Electrode

[Manufacture of a Cathode/a Counter Electrode]

PVP-capped Pt nanoclusters are synthesized using the following procedure: 0.1 grams (g) of poly(N-vinyl-2-pyrrolidone (PVP) (MW=8000) is dissolved in 44 milliliters (ml) of de-ionized water at room temperature in a beaker with stirring. 0.2 g of $H_2PtCl_6$ as precursors is added to the prepared PVP solution, and the ratio of the weight of polymer (PW) to the weight of noble metal (MW) is about 1.1. Then, 5 ml of reductant (0.5M $NaBH_4$ solution) is added slowly to the beaker. The solution quickly changes from yellowish to black, indicating the formation of Pt nanoclusters. The whole procedure is done at room temperature within 30 minutes.

A clean ITO glass plate (20Ω/□) is immersed in a tank containing 1% of conditioner (ML-371, available from Rockwood Electrochemicals Asia Ltd.) at 60° C. for 5 minutes. The conditioner is commonly used in the printed circuit board (PCB) industry as grafting agents. The conditioner is adapted to change the surface charge state of ITO glass and makes the surface be positively charged. After rinsing with de-ionized water, the conditioned ITO glass plate is immersed in the as-prepared PVP-capped Pt suspension for 5 minutes. The negatively charged PVP-capped Pt nanoclusters are adsorbed on the ITO glass plate, and thus an electrochemical catalyst layer is formed on the conditioned ITO glass plate. Finally, the glass plate is rinsed with de-ionized water again and dried in air.

[Manufacture of an Anode/A Working Electrode]

0.036 grams of dye, N-719, available from Solaronix (represented by the Formula 2 above), is dissolved in a solution containing acetonitrile, t-butanol and ethanol with a volumetric ratio of 2:1:1 (50 ml, 25 ml, 25 ml) to formulate a dye solution in a concentration of 3 mM.

A $TiO_2$/ITO glass plate (available from Dyesol Ltd. in Australia) is cut into 2 cm×2 cm with a $TiO_2$ film having a surface area of 0.5 cm×0.5 cm. Next, the $TiO_2$/ITO glass plate is heated at 550° C. for 10 minutes to improve the interconnection within ITO film. The $TiO_2$/ITO glass plate is immersed in the prepared dye solution at 40° C. for 1 hour with stirring. After dye impregnation is performed, the electrode is removed from the dye solution and then rinsed with acetonitrile.

[Cell Assembling]

Cell assembling procedure includes laminating the cathode and the anode obtained above with a 25 μm-thick thermoplastic hot-melt sealing sheet (SX-1170-25, available from Solaronix) in between to provide the laminated cell, and curing at 100° C. to provide a sealed cell. Herein, a hollow is predetermined in the hot-melt sealing sheet for filling with an electrolyte. The electrolyte containing 0.6M of 1-propyl-2,3-dimethylimidazolium iodide (DMPII), 0.1M of lithium iodide (LiI), 0.05M of iodine, and 0.5M of 4-tert-butylpyridine (TBP) in 3-methoxypropionitrile (MPN) is injected into the hollow between the cathode and the anode in the above sealed cell to provide a DSSC.

EXAMPLE 2

Manufacture of an Electrode Comprising an Electrochemical Catalyst Layer and a Solar Cell Using the Electrode Here, a DSSC is provided in the same manner as described in Example 1, except that the amounts of PVP and $H_2PtCl_6$ used in PVP-capped Pt suspension for manufacturing the cathode are 0.5 g and 0.2 g, respectively.

EXAMPLE 3

Manufacture of an Electrode Comprising an Electrochemical Catalyst Layer and a Solar Cell Using the Electrode Here, a DSSC is provided in the same manner as described in Example 1, except that the amounts of PVP and $H_2PtCl_6$ used in PVP-capped Pt suspension for manufacturing the cathode are 2 g and 0.2 g, respectively.

EXAMPLE 4

Manufacture of an Electrode Comprising an Electrochemical Catalyst Layer and a Solar Cell Using the Electrode Here, a DSSC is provided in the same manner as described in Example 1, except that an ATO glass with $TiO_2$ paste (available from Dyesol Ltd. in Australia) of 1 cm×0.5 cm printed thereon substitutes for a $TiO_2$/ITO glass plate with a $TiO_2$ film during manufacturing the anode.

EXAMPLE 5

Manufacture of an Electrode Comprising an Electrochemical Catalyst Layer and a Solar Cell Using the Electrode Here, a DSSC is provided in the same manner as described in Example 4, except that the cathode is further thermally treated at about 270° C. for 10 minutes when manufactured.

COMPARATIVE EXAMPLE 1

In this example, a compared DSSC is provided in the same manner as described in Example 1, except that the electrochemical catalyst layer of the cathode is formed by a conventional sputtering method. Namely, a thin film of Pt is sputter-deposited on a clean ITO glass plate (20Ω/□) to a thickness of at least 100 nm during manufacturing the cathode.

EXPERIMENTAL EXAMPLE 1

The following test is used to analyze the loading of an electrochemical catalyst layer on an electrode. The sample electrode obtained from Example 2 is tested, whereas the one made by conventional method obtained from Comparative Example 1 is also tested as a reference.

According to the analysis of inductively coupled plasma-atomic emission spectroscopy (ICP-AES), the platinum loading of Example 2 is 4.89 μg/cm$^2$, and that of a 100 nm-thick platinum layer in Comparative Example 1 is 200 μg/cm$^2$. It is possible to form an ultra-thin layer of PVP-capped Pt clusters onto ITO glass by performing a pretreatment or conditioning step, which modifies the surface of ITO glass and improves adhesion between the PVP-capped Pt clusters and the underlying support. Clearly, the method provided herein utilizes a smaller amount of platinum than the conventional method.

EXPERIMENTAL EXAMPLE 2

The following test is used to evaluate the catalytic effect on tri-iodide reduction of an electrode. The sample electrodes obtained from Example 2 and Comparative Example 1 are separately tested. A symmetric testing cell is constructed in a manner similar to Example 2 except for switching the anode with the cathode; in other words, the testing cell is made of two identical counter electrodes made by the method in Example 2.

Figure 4:
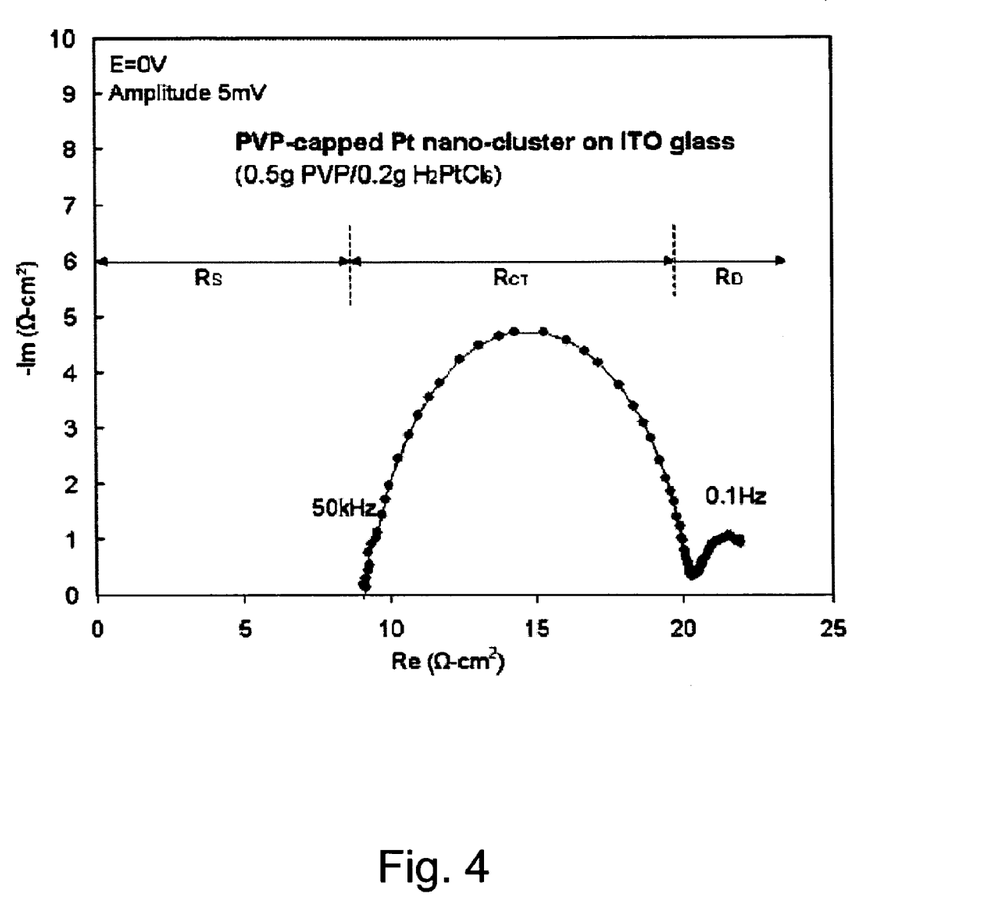
FIG. 4 shows a Nyquist plot for a symmetric testing cell constructed by two identical counter electrodes according to Example 2.

Electrochemical impedance spectroscopy (EIS) is performed by an AUTOLAB P10 potentialstat analyzer at the frequency ranging from 50 kHz to 0.1 Hz with amplitude of 5 mV. The result is shown in FIG. 4, and three distinguishable impedances are found in the Nyquist plot: series resistance ($R_s$), charge-transfer resistance ($R_{CT}$) and Nernst diffusion resistance ($R_D$). From FIG. 4, an $R_{CT}$ of 5.66 Ωcm$^2$ is deduced for a PVP-capped Pt electrode, which is an index of the catalytic performance of the Pt electrode. As compared to conventional sputtering deposition that an $R_{CT}$ of 10.8 Ωcm$^2$ is measured for Comparative Example 1, the electrochemical catalyst layer comprised of polymer-capped Pt nanoclusters has better catalytic effect.

EXPERIMENTAL EXAMPLE 3

The following test is used to evaluate the performance of a DSSC employed with counter electrodes respectively obtained from Examples 1~3 and Comparative Example 1 as a reference.

Figure 5:
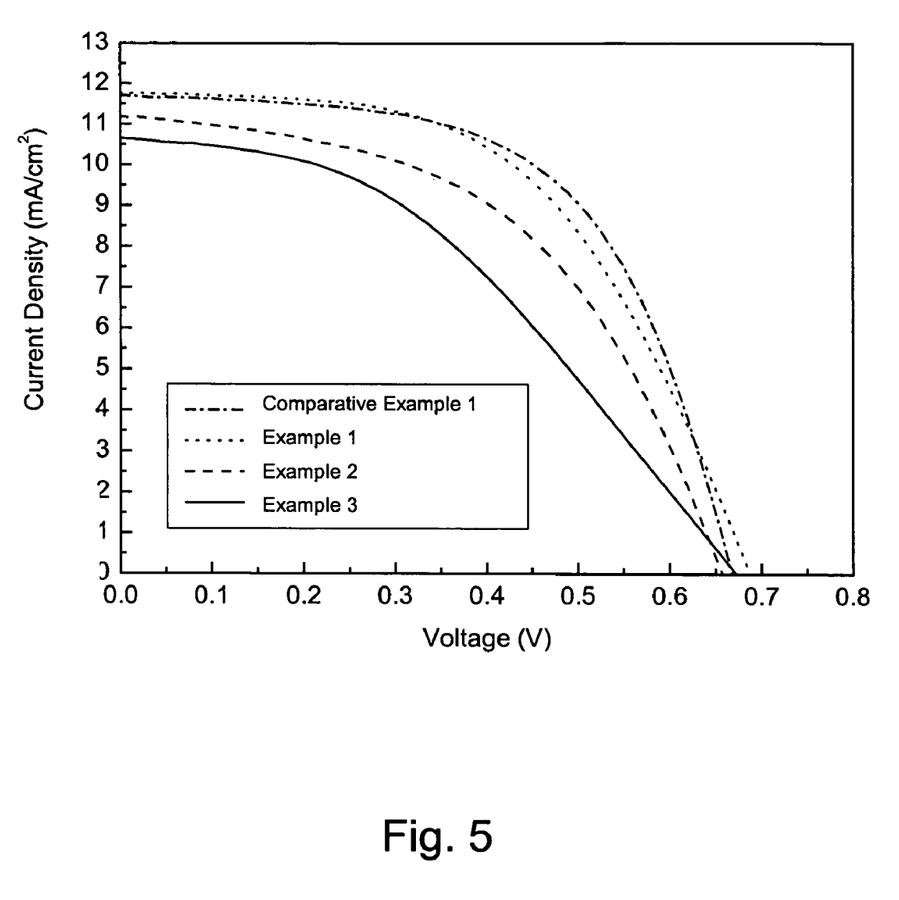
FIG. 5 is a graph showing variations in current density depending on voltage for each electrochemical device according to Examples 1~3 and Comparative Example 1.

An I-V curve measurement is performed by scanning a DSSC from the open circuit voltage ($V_{oc}$) of the cell to the short circuit condition ($I_{sc}$) at 5 mV/sec using an AUTOLAB P10 potentialstat under illumination by a Newport solar simulator (AM1.5, 100 mW/cm$^2$). The result is plotted in FIG. 5. The data are listed in Table 1, where FF represents fill factor and $\eta_{eff}$ is the overall conversion efficiency calculated based on equations 1 and 2 expressed as follows.

$$FF = \frac{P_{MAX}}{V_{OC} \times I_{SC}} \quad \text{[Equation 1]}$$

Where $P_{MAX}$ is the maximum power during scanning, $V_{oc}$ is the open circuit voltage, and $I_{sc}$ is the short circuit current.

$$\eta_{eff} = \frac{P_{MAX}}{P_{IN}} = \frac{V_{OC} \times I_{SC} \times FF}{P_{IN}} \quad \text{[Equation 2]}$$

Where $P_{IN}$ is the input power of a solar simulator, i.e. 100 mW/cm$^2$.

TABLE 1

| Counter electrode | $V_{OC}$ (V) | $I_{SC}$ (mA/cm$^2$) | FF | $\eta_{eff}$ (%) |
|---|---|---|---|---|
| Example 1 | 0.69 | 11.8 | 0.53 | 4.32 |
| Example 2 | 0.66 | 11.2 | 0.50 | 3.69 |
| Example 3 | 0.67 | 10.6 | 0.41 | 2.92 |
| Comparative Example 1 | 0.67 | 11.6 | 0.58 | 4.55 |

From Table 1, it is found that the cell employed with the electrode of Example 1 performs more than 90% in comparison to the sputtered electrode, and the conditioner layer and polymers surrounding on the Pt nanoclusters only influence FF a little; due to the greater catalytic effect compared with that of the conventional sputtered electrode, the $V_{oc}$ and $I_{sc}$ of the cell constructed by the counter electrode in Example 1 are higher than the one made of sputtered electrode. However, as the polymer content increases (such as in Examples 2 and 3), the catalytic effect of PVP-capped Pt nanoclusters decreases and the internal resistance of the cell increases due to an excess of polymer. Therefore, the catalytic effect may be influenced by PVP chains surrounding on the Pt nanoclusters.

EXPERIMENTAL EXAMPLE 4

Figure 6:
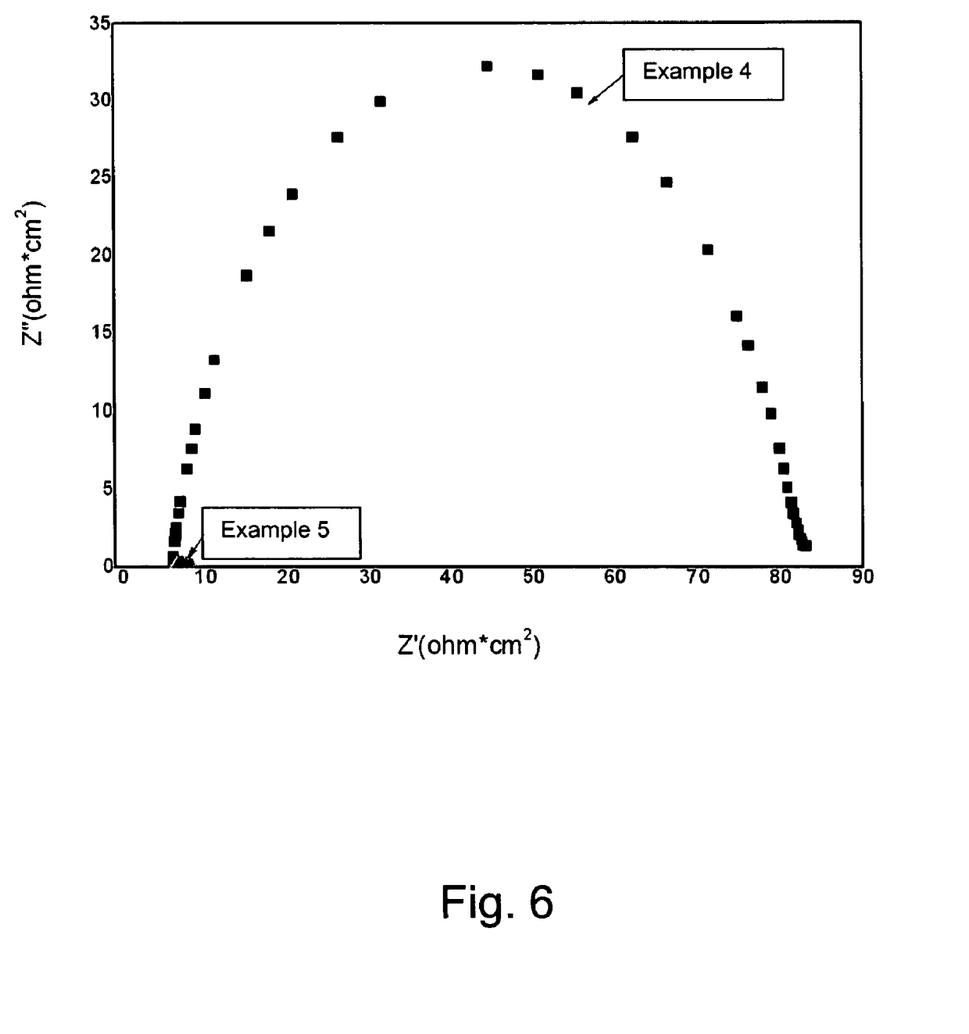
FIG. 6 shows a Nyquist plot for symmetric testing cells constructed by two identical counter electrodes according to Examples 4~5, respectively.

Here, the sample electrodes obtained from Examples 4 and 5 are tested in a manner similar to Experimental Example 2. The Nyquist plot in FIG. 6 shows an $R_{CT}$ of 38.3 Ωcm$^2$ measured for Example 4 and an $R_{CT}$ of 0.56 Ωcm$^2$ measured for Example 5, which implies that the catalytic performance of a PVP-capped Pt electrode is enhanced by thermally treating the electrode at a temperature substantially below 300° C.

EXPERIMENTAL EXAMPLE 5

Figure 7:
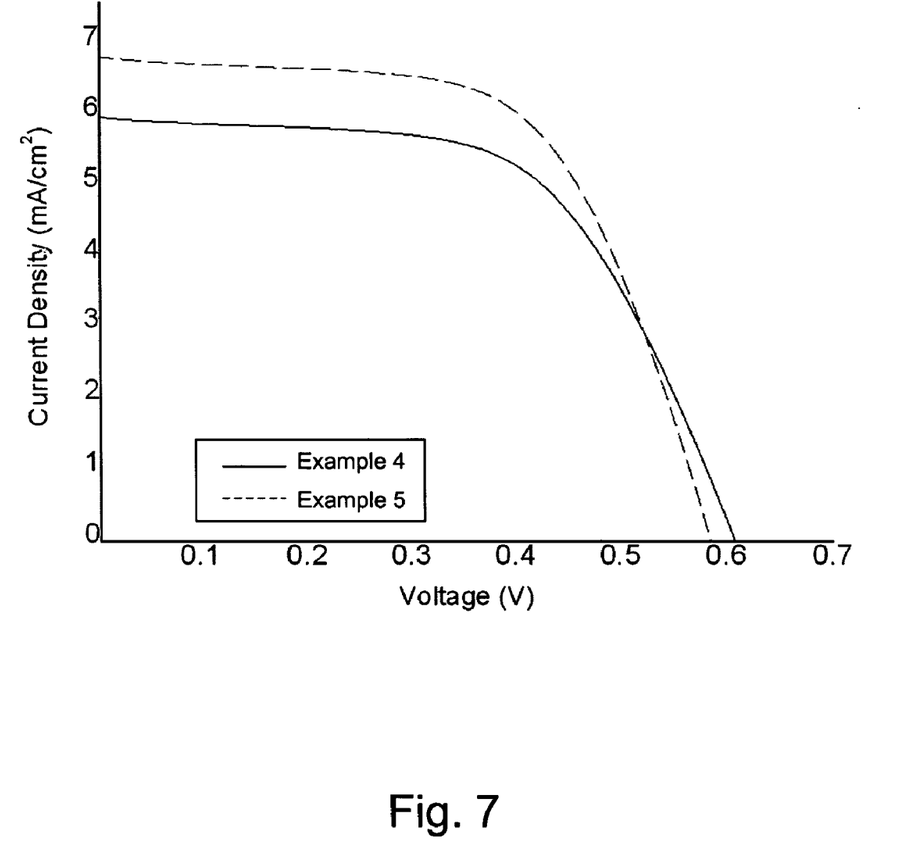
FIG. 7 is a graph showing variations in current density depending on voltage for each electrochemical device according to Examples 4~5.

Here, the cells employed with the electrodes obtained from Examples 4 and 5 are tested in a manner similar to Experimental Example 3. The result is plotted in FIG. 7, of which $V_{oc}$, $I_{sc}$ and $\eta_{eff}$ are summarized in Table 2. It is apparent from Table 2 that the cell constructed by the thermally treated electrode has improved performance as a whole.

TABLE 2

| Counter electrode | $V_{OC}$ (V) | $I_{SC}$ (mA/cm$^2$) | FF | $\eta_{eff}$ (%) |
|---|---|---|---|---|
| Example 4 | 0.61 | 5.88 | 0.59 | 2.1 |
| Example 5 | 0.58 | 6.73 | 0.61 | 2.4 |

The comparison of the performance among different counter electrodes in DSSCs is shown in Table 3. Reference 1 refers to Hauch et al. (*Electrochimi. Acta*, 2001, 46, pp 3457), entitled "Diffusion in the electrolyte and charge-transfer reaction at the platinum electrode in dye-sensitized solar cells", in which the preparing condition is identical to Comparative Example 1 except that the sputtered thickness of Pt is 3 nm.

From Table 3, the electrode for Example 2 shows an acceptable catalytic effect with low Pt loading.

TABLE 3

| Types of Pt electrodes | Pt loading (μg/cm$^2$) | $R_{CT}$ (Ωcm$^2$) | Solvent | Highest preparation Temperature (° C.) |
| --- | --- | --- | --- | --- |
| Example 2 | 4.89 | 5.66 | MPN | <300 |
| Thermal Cluster Pt | 5 | <1 | NMO | 380 |
| Reference 1 | 6.44 | 57 | MPN | Depending on sputtering time |
| Comparative Example 1 | ~200 | 10.8 | MPN | Depending on sputtering time |

INDUSTRIAL APPLICABILITY

As can be seen from the foregoing, an electrochemical catalyst layer for an electrode is formed from polymer-capped noble metal nanoclusters via immersing or dipping, by which the amount of noble metal used is reduced according to the invention. Furthermore, implementing thermal treatment improves the performance of the resultant electrochemical device. The overall procedure is not operated at a substantially high temperature; for instance, the immersion step is performed below about 50° C., and the thermal-treatment is performed approximately below 300° C. Therefore, the inventive method has lower cost of materials and equipment and competent performance with conventional methods. It is suitable for mass production as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of manufacturing an electrochemical device, the method comprising:
    forming a first electrode, comprising:
        providing a first substrate having a first conductive layer;
        immersing the first substrate in a first solution containing a surfactant to form a conditioner layer on the first conductive layer;
        immersing the first substrate in a second solution containing polymer-capped noble metal nanoclusters to form a polymer-protected electrochemical catalyst layer by adsorbing the polymer-capped noble metal nanoclusters on the conditioner layer; and
        thermally treating the polymer-protected electrochemical catalyst layer over the first substrate at a temperature of about 270° C. to partially or completely degrade the surfactant of the conditioner layer and the polymer of the polymer-protected electrochemical catalyst layer;
    forming a second electrode;
    assembling the first electrode and the second electrode; and
    injecting an electrolyte into a space between the first electrode and the second electrode.

2. The method of claim 1, wherein the step of thermally treating the polymer-protected electrochemical catalyst layer comprises heating the first substrate for duration less than 30 minutes.

3. The method of claim 1, wherein the step of immersing the first substrate in the second solution comprises dipping the first substrate into the second solution at a temperature below 50° C.

4. The method of claim 1, wherein forming the first electrode further comprises preparing the second solution, comprising:
    providing a polymer solution capable of capping a noble metal;
    adding a precursor of noble metal salt into the polymer solution; and
    adding a reductant into the polymer solution containing the precursor to make the noble metal salt be reduced to noble metal particles.

5. The method of claim 1, wherein forming the second electrode comprises:
    forming a layer of conductive glass on a second substrate; and
    forming a dye-impregnated TiO$_2$ layer on the layer of conductive glass.

6. The method of claim 1, wherein assembling the first electrode and the second electrode comprises:
    placing a sealing layer in between the first electrode and the second electrode; and
    laminating the first electrode and second electrode by means of the sealing layer.

* * * * *